United States Patent
Hong et al.

(10) Patent No.: US 12,423,778 B2
(45) Date of Patent: Sep. 23, 2025

(54) IMAGE ENHANCEMENT METHOD AND DEVICE FOR DEFOGGING AND DARK AREA ENHANCEMENT USING DARK AND ANTI-BRIGHT CHANNEL CALCULATIONS

(71) Applicant: FAURECIA CLARION ELECTRONICS (XIAMEN) CO., LTD., Fujian (CN)

(72) Inventors: Chuyang Hong, Fujian (CN); Cailing Xu, Fujian (CN); Dong He, Fujian (CN)

(73) Assignee: FAURECIA CLARION ELECTRONICS (XIAMEN) CO., LTD., Xiamen (CN)

( * ) Notice: Subject to any disclaimer, the term of this patent is extended or adjusted under 35 U.S.C. 154(b) by 366 days.

(21) Appl. No.: 18/186,736

(22) Filed: Mar. 20, 2023

(65) Prior Publication Data
US 2023/0306569 A1    Sep. 28, 2023

(30) Foreign Application Priority Data
Mar. 22, 2022    (CN) .......................... 202210282837.4

(51) Int. Cl.
*G06T 5/00*    (2024.01)
*G06T 3/40*    (2006.01)
(Continued)

(52) U.S. Cl.
CPC .................. *G06T 5/50* (2013.01); *G06T 3/40* (2013.01); *G06T 5/20* (2013.01); *G06T 5/40* (2013.01);
(Continued)

(58) Field of Classification Search
CPC ... G06T 2207/10024; G06T 3/40; G06T 5/40; G06T 5/73; G06T 2207/20212; G06T 5/70; G06V 10/56; G06V 10/60
See application file for complete search history.

(56) References Cited

U.S. PATENT DOCUMENTS

2021/0202063 A1*    7/2021   Li ........................... G06V 20/52

FOREIGN PATENT DOCUMENTS

CN    107610058 A  *  1/2018
CN    109919879 A  *  6/2019
(Continued)

OTHER PUBLICATIONS

Wang, Shiqi, et al. "Adaptive bright and dark channel combined with defogging algorithm based on depth of field." Journal of Sensors 2022.1 (2022): 5330876.*

*Primary Examiner* — Li Liu
(74) *Attorney, Agent, or Firm* — Kilpatrick Townsend & Stockton LLP (57) ABSTRACT

The present disclosure discloses an image processing method, an image processing device and a computer-readable storage medium. The image processing method includes following steps: acquiring an original image; performing dark channel calculation according to the original image to obtain a dark channel image; performing anti-bright channel calculation according to the original image to obtain an anti-bright channel image; processing the dark channel image according to a defogging model to obtain a bright area enhanced image; processing the anti-bright channel image according to the defogging model to obtain a dark area enhanced image; and combining the bright area enhanced image and the dark area enhanced image to obtain an enhanced image. By performing these steps, the image processing method can achieve general image enhancement (Continued)

effects such as image defogging and dark area enhancement with less calculation.

10 Claims, 5 Drawing Sheets

(51) Int. Cl.
*G06T 5/20* (2006.01)
*G06T 5/40* (2006.01)
*G06T 5/50* (2006.01)
*G06T 5/70* (2024.01)
*G06T 7/90* (2017.01)

(52) U.S. Cl.
CPC ................. *G06T 5/70* (2024.01); *G06T 7/90* (2017.01); *G06T 2207/10024* (2013.01); *G06T 2207/20212* (2013.01)

(56) References Cited

FOREIGN PATENT DOCUMENTS

| | | | | | |
|---|---|---|---|---|---|
| CN | 110097520 | A | * | 8/2019 | ............. G06T 5/003 |
| CN | 110148093 | A | * | 8/2019 | ............. G06T 5/003 |
| CN | 111292258 | A | * | 6/2020 | ............. G06T 5/003 |
| CN | 111598814 | A | * | 8/2020 | ............. G06T 5/40 |
| CN | 113962872 | A | * | 1/2022 | |

\* cited by examiner

IMAGE ENHANCEMENT METHOD AND DEVICE FOR DEFOGGING AND DARK AREA ENHANCEMENT USING DARK AND ANTI-BRIGHT CHANNEL CALCULATIONS

FIELD

The present disclosure relates to the image processing field, in particular to an image processing method, an image processing device and a computer-readable storage medium.

BACKGROUND OF THE DISCLOSURE

Affected by different environmental factors, pictures collected by a camera will be interfered by various lighting conditions, such as fog interference, sand dust interference, weak light interference and water wave interference, etc. Existing technologies generally need to classify the interference scenarios of these interfered pictures first, and then contrapuntally design image processing methods such as defogging, sand and dust environment repairing, night vision enhancing to optimize images.

However, in practical applications, because the real interference is often not the result of a single interference factor, but a mixture of a plurality of interference factors, it is difficult to accurately classify the real scenario. Even at the expense of a large amount of calculation and calculating speed, using complex deep learning models to classify interference scenario, it often fails to achieve the expected accuracy.

In order to solve the above problems in the existing technology, a general image processing technology is urgently needed in this field for generally enhancing the image, taken in fog interference, weak light interference and some other lighting interference environments, through a small amount of calculation, so as to improve the image quality and enhance the visual effect of the image.

BRIEF SUMMARY OF THE DISCLOSURE

A brief overview of one or more embodiments is provided below to provide a basic understanding of these embodiments. The summary is not an exhaustive overview of all embodiments envisaged, and is neither intended to identify the key or decisive elements of all embodiments nor to attempt to define the scope of any or all embodiments. The sole purpose of the summary is to present some concepts of one or more embodiments in a simplified form as a prelude to the more detailed description that is presented later.

In order to solve the above problems in the existing technology, the embodiments of the present disclosure provides an image processing method. The image processing method includes the following steps: acquiring an original image; performing dark channel calculation according to the original image to obtain a dark channel image; performing anti-bright channel calculation according to the original image to obtain an anti-bright channel image; processing the dark channel image according to a defogging model to obtain a bright area enhanced image; processing the anti-bright channel image according to the defogging model to obtain a dark area enhanced image; and combining the bright area enhanced image and the dark area enhanced image to obtain an enhanced image. By performing these steps, the image processing method can carry out a general image enhancement processing, including defogging and dark area enhancing, for images taken in a plurality of light interference environments such as fog interference and weak light interference through a small amount of calculation, so as to improve the image quality and enhance the visual effect of the images.

In an embodiment, steps of performing anti-bright channel calculation according to the original image to obtain an anti-bright channel image include: determining a bright channel image according to a maximum value of R channel, G channel and B channel of a plurality of pixel points in the original image; and performing grayscale inversion to the bright channel image to obtain the anti-bright channel image.

In an embodiment, steps of processing the anti-bright channel image according to the defogging model to obtain a dark area enhanced image include: determining an anti-bright channel adjustment parameter and an anti-bright channel atmospheric light intensity parameter; and performing defogging model calculation according to the original image, the anti-bright channel adjustment parameter, the anti-bright channel atmospheric light intensity parameter and the anti-bright channel image to obtain the dark area enhanced image.

In an embodiment, steps of determining an anti-bright channel adjustment parameter include: respectively determining average grayscale values of R channel, G channel and B channel of a plurality of pixel points in the original image; carrying out inverse color processing according to the average grayscale values of the R channel, the G channel and the B channel to determine a first adaptive parameter; and determining the anti-bright channel adjustment parameter according to the first adaptive parameter.

In an embodiment, steps of determining the anti-bright channel atmospheric light intensity parameter include: determining a plurality of pixel points with higher grayscale value in the anti-bright channel image; respectively determining R channel grayscale, G channel grayscale and B channel grayscale of the plurality of pixel points according to the original image; and respectively determining an atmospheric light intensity parameter of the R channel, the G channel and the B channel, according to an average grayscale value of the R channel, an average grayscale value of the G channel and an average grayscale value of the B channel.

In an embodiment, steps of processing the dark channel image according to a defogging model to obtain a bright area enhanced image include: determining grayscale values of R channel, G channel and B channel of a plurality of pixel points in the original image; determining a second adaptive parameter according to the R channel grayscale value, G channel grayscale value and B channel grayscale value; determining a dark channel adjustment parameter according to the second adaptive parameter; determine an atmospheric light intensity parameter of the dark channel; and performing defogging model calculation according to the original image, the dark channel adjustment parameter, the atmospheric light intensity parameter of the dark channel and the dark channel image to obtain the bright area enhanced image.

In an embodiment, before the dark channel calculation and anti-bright channel calculation, the image processing method further includes following steps: respectively acquiring a grayscale level histogram of R channel, G channel and B channel of the original image; determining a first position and a second position of adaptive nonlinear stretching according to a preset truncation ratio, and a grayscale value indicated by the first position is lower than a grayscale value indicated by the second position; and performing linear mapping to the grayscale level histogram between a grayscale interval below the first position and above the second position, and performing mapping to the grayscale level histogram based on a γ curve, according to an average grayscale value in original image and in the grayscale interval between the first position and the second position, to obtain an adaptive nonlinear stretched image, and the stretched image replaces the original image and is used for performing the dark channel calculation, performing the anti-bright channel calculation, acquiring the bright area enhanced image and/or acquiring the dark area enhanced image.

In an embodiment, before the dark channel calculation and the anti-bright channel calculation, the image processing method further includes a following step: downsampling the original image or the stretched image for performing the dark channel calculation and/or the anti-bright channel calculation to obtain a thumbnail image, and the thumbnail image replaces the original image or the stretched image and is used for performing the dark channel calculation and/or the anti-bright channel calculation.

In an embodiment, before obtaining the bright area enhanced image and the dark area enhanced image, the image processing method further includes following steps: performing upsampling according to the dark channel image to obtain a dark channel image with a same size as the original image; and performing upsampling according to the anti-bright channel image to obtain an anti-bright channel image with a same size as the original image.

In an embodiment, before performing upsampling according to the dark channel image and the anti-bright channel image, the image processing method further includes a following step: performing wave filtering to the dark channel image and the anti-bright channel image to eliminate edge effects, ensure local smooth transition, and prevent affecting the visual effect by local area color jump in subsequent processing.

In an embodiment, steps of combining the bright area enhanced image and the dark area enhanced image to obtain an enhanced image further include: determining a third adaptive parameter of the bright area enhanced image and a fourth adaptive parameter of the dark area enhanced image according to a grayscale value of the dark area enhanced image, and a sum of the third adaptive parameter and the fourth adaptive parameter is 1; and performing weighted summation to the dark area enhanced image and the bright area enhanced image according to the third adaptive parameter and the fourth adaptive parameter to obtain the enhanced image.

Embodiments of the present disclosure also provides an image processing device. The image processing device includes a memory and a processor. The processor is connected to the memory and configured to implement the above image processing method provided in the embodiments of the present disclosure. By implementing the above image processing method, the image processing device can carry out a general image enhancement processing, including defogging and dark area enhancing for images taken in a plurality of light interference environments such as fog interference and weak light interference through a small amount of calculation, so as to improve the image quality and enhance the visual effect of the images.

Embodiments of the present disclosure also provides a computer-readable storage medium on which computer instructions are stored. When the computer instructions are executed by a processor, the above image processing method provided in the embodiments of the present disclosure is implemented. By implementing the above image processing method, the computer-readable storage medium can carry out a general image enhancement processing, including defogging and dark area enhancing, for images taken in a plurality of light interference environments such as fog interference and weak light interference through a small amount of calculation, so as to improve the image quality and enhance the visual effect of the images.

BRIEF DESCRIPTION OF THE DRAWINGS

The above disclosure will be better understood after reading the detailed description of the embodiments of the present disclosure in conjunction with the following figures. In the figures, components are not necessarily drawn to scale, and components having similar related features may have the same or similar reference numerals.

REFERENCE SIGNS

100: image processing device;
110: memory;
120: processor;
S210-S230: steps;
41: start position;
42: stop position;
43: lower position; and
44: upper position.

DETAILED DESCRIPTION OF THE DISCLOSURE

The implementations of the present disclosure are described below by specific embodiments. Although the description of the present disclosure is introduced together with some embodiments, it does not mean that the features of the present disclosure are limited to the embodiments. The purpose of introducing the present disclosure in combination with the embodiments is to cover other options or modifications that may be extended based on the claims of the present disclosure. In order to provide a deep understanding of the present disclosure, the following description will contain many specific details. The present disclosure can also be implemented without using these details. In addition, in order to avoid confusion or ambiguity of the key points of the present disclosure, some specific details is omitted in the description.

In the description of the present disclosure, it should be noted that, unless otherwise specified and defined, the terms "installation", "connecting" and "connection" should be understood in a broad sense. For example, they can be fixed connection, removable connection or integrated connection; mechanical connection or electrical connection; as well as direct connection, indirect connection through intermediate media or internal connection of two components. The specific meaning of the above terms in the present disclosure can be understood in specific cases.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present disclosure.

As mentioned above, affected by different environmental factors, pictures collected by a camera will be interfered by various lighting conditions, such as fog interference, sand dust interference, weak light interference and water wave interference, etc. Existing technologies generally need to classify the interference scenarios of these interfered pictures first, and then contrapuntally design image processing methods such as defogging, sand and dust environment repairing, night vision enhancing to optimize images. However, in practical applications, because the real interference is often not the result of a single interference factor, but a mixture of a plurality of interference factors, it is difficult to accurately classify the real scenario. Even at the expense of a large amount of calculation and calculating speed, using complex deep learning models to classify interference scenario, it often fails to achieve the expected accuracy.

In order to solve the above problems in the existing technology, the present disclosure provides an image processing method, an image processing device and a computer-readable storage medium, which can carry out defogging and dark area enhancing processing on images taken under a plurality of light interference environments such as fog interference and weak light interference through a small amount of calculation, so as to improve the image quality and enhance the visual effect of the images.

In some non-limiting embodiments, the image processing method provided in the embodiments of the present disclosure can be implemented by the image processing device provided in the embodiments of the present disclosure. Please refer to FIG. 1, which shows a structural diagram of an image processing device provided according to one embodiment of the present disclosure.

Figure 1:
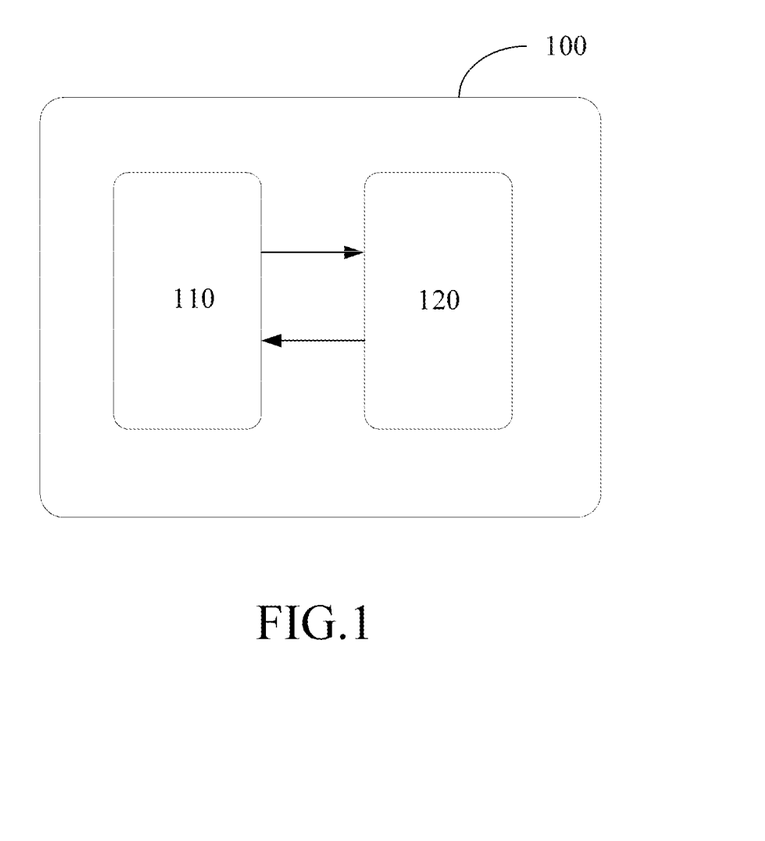
FIG. 1 shows a structural block diagram of the image processing device provided according to some embodiments of the present disclosure.

As shown in FIG. 1, the image processing device 100 is configured with a memory 110 and a processor 120. The memory 110 includes, but is not limited to, the computer-readable storage medium provided in the embodiments of the present disclosure, on which computer instructions are stored. The processor 120 is connected to the memory 110 and configured to execute the computer instructions stored on the memory 110 to implement the above image processing method provided in the embodiments of the present disclosure.

The working principle of the above image processing device 100 will be described below according to the embodiments of some image processing methods. The embodiments of these image processing methods only provide some non-limiting ways of implementation, which is intended to clearly display the main idea of the present disclosure, and provide some specific solutions that are convenient for the public to implement, rather than limiting all working modes or all functions of the image processing device 100. Similarly, the image processing device 100 is only a non-limiting embodiment provided by the present disclosure, and does not limit the implementation subject to each step in these image processing methods.

Figure 2:
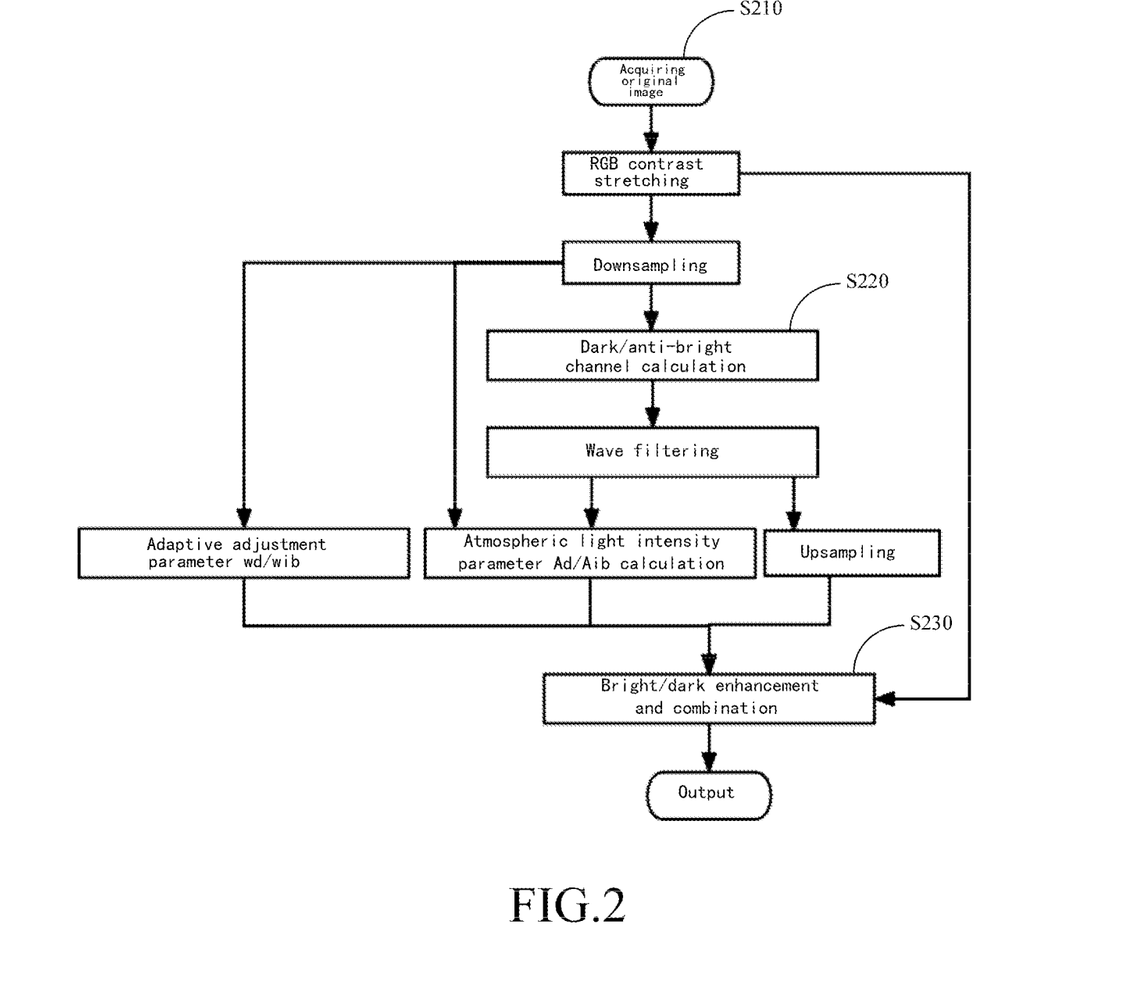
FIG. 2 shows a flowchart of the image processing method provided according to some embodiments of the present disclosure.

Please refer to FIG. 2, which shows a flowchart of an image processing method provided according to some embodiments of the present disclosure.

As shown in FIG. 2, in some embodiments of the present disclosure, the image processing method includes step S210: acquiring an original image $I_0(x)$.

The above original image $I_0(x)$ includes but is not limited to photo, video single frame image and other image acquired by a camera, a video camera, a mobile phone, a driving recorder, a 360° panoramic image system and other camera equipment. The image content therein may be blurred due to color deviation and/or low contrast, due to one or more interference factors such as fog interference, dust interference, weak light interference, water wave interference, etc.

Because the original image $I_0(x)$, taken in the sand and dust weather, underwater photographing condition and other environments with external light interference, may have the problem of image color deviation, that is, the grayscale level histogram of RGB channel may have uneven distribution. In some embodiments, after acquiring the original image $I_0(x)$, the image processing device 100 can correct the above image color deviation problem by performing RGB contrast stretching on the acquired original image $I_0(x)$, and obtain a stretched image $I(x)$ that removes color deviation.

Figure 3:
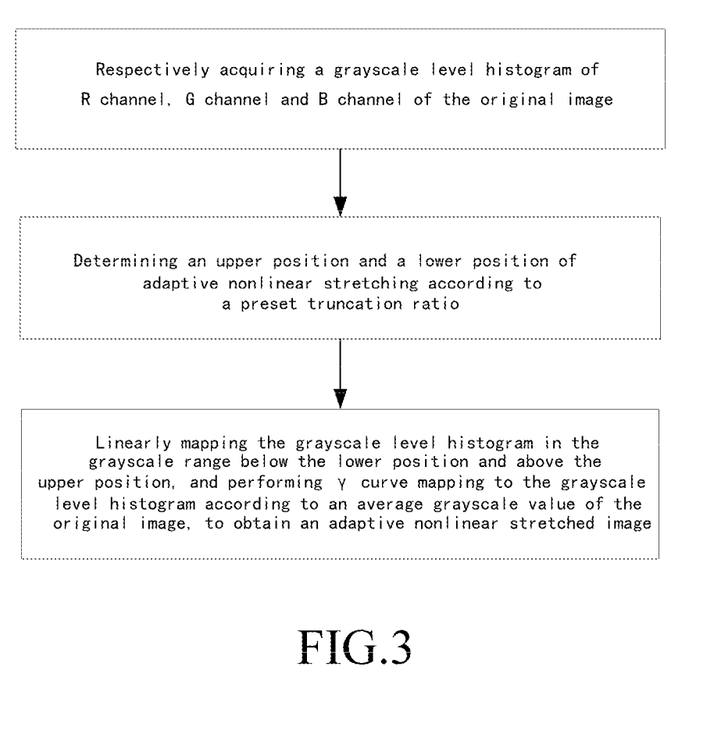
FIG. 3 shows a flow chart of an image RGB contrast stretching method provided according to some embodiments of the present disclosure.
Figure 4:
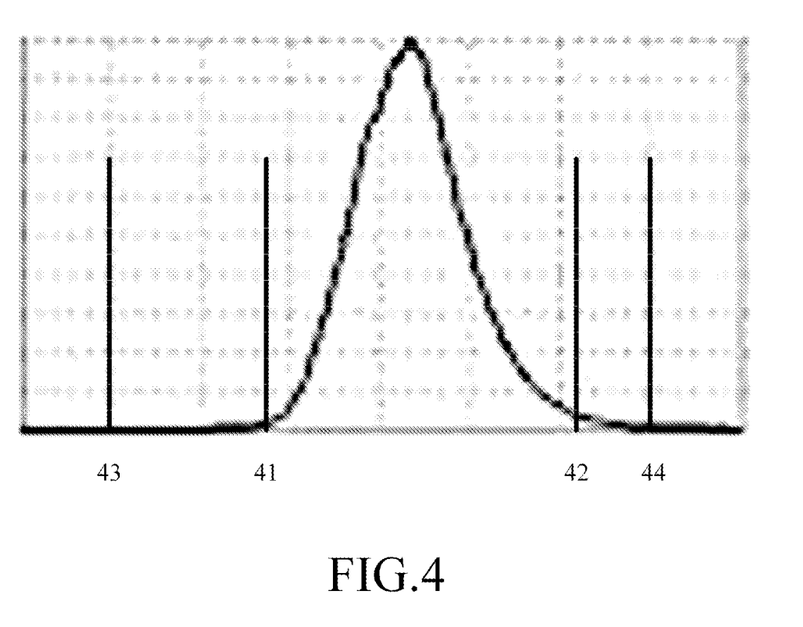
FIG. 4 shows a grayscale level histogram of any single RGB channel in the image provided according to some embodiments of the present disclosure.

Please refer to FIG. 3 and FIG. 4 in combination for details. FIG. 3 shows a flowchart of an image RGB contrast stretching method provided according to some embodiments of the present disclosure. FIG. 4 shows a grayscale level histogram of any single RGB channel in the image provided according to some embodiments of the present disclosure.

As shown in FIG. 3, in the process of RGB contrast stretching, the image processing device 100 can respectively obtain the R channel grayscale level histogram, the G channel grayscale level histogram and the B channel grayscale level histogram of the original image $I_0(x)$ first, and then determine a first position and a second position according to a preset clipRatio, for performing adaptive nonlinear stretching.

In one embodiment, the input original image $I_0(x)$ can be regarded as a superimposed image, composed of three single channel images of red (R), green (G) and blue (B). The image processing device 100 can statistic the grayscale value of each pixel point in each single channel separately to respectively obtain the R channel grayscale level histogram, the G channel grayscale level histogram and the B channel grayscale level histogram of the original image $I_0(x)$.

As shown in FIG. 4, assuming the single channel image size of the original image $I_0(x)$ is w*h, the image $I_0(x)$ includes imageSize=w*h pixel points. The image processing device 100 can calculate a corresponding truncation point number according to the preset clipRatio (i.e., clipRatio*imageSize, e.g. clipRatio=0.005), and then determine a corresponding start position 41 and a stop position 42 in the grayscale level histogram according to the truncation point number, that is $$\sum_{i=0}^{start} hist[i] \le clipRatio \times imageSize$$

$$\sum_{i=stop}^{255} hist[i] \le clipRatio \times imageSize$$

Since there are a large number of noise points in the low grayscale level area and the high grayscale level area of the original image $I_0(x)$, compared with the method of directly determining the darkest point and the brightest point in the original image $I_0(x)$ as the start position 41 and the stop position 42, the present disclosure can effectively avoid the possibility of regarding a noise point as the start position 41 or the stop position 42, to improve the reliability of RGB contrast stretching.

Further, since the grayscale level histogram distribution of some pictures in reality is distributed in a small range, if RGB contrast stretching is carried out strictly according to the start position 41 and the stop position 42, image color deviation may be further aggravated. In order to avoid the above situation as well as improve the reliability and universality of the image processing method, the present disclosure can also be set a lower position 43 and an upper 44 to limit and constrain an adjustment range.

For example, the image processing device 100 can determine the lower position 43 and the upper position 44 of the RGB contrast stretching respectively according to a first preset value $n_1$ (e.g. 32) and a second preset value $n_2$ (e.g. $255-n_1$), that is lower=min{$n1$,start} upper=max{$n2$,stop}

As shown in FIG. 3, after determining the lower position 43 (i.e. the first position) and the upper position 44 (i.e. the second position) of RGB contrast stretching, the image processing device 100 can perform linear mapping to the grayscale level histogram in the grayscale range below the lower position 43 and in the grayscale range above the upper position 44, and performing mapping to the grayscale level histogram based on a $\gamma$ curve, according to an average grayscale value u of the original image $I_0(x)$, to obtain the adaptive nonlinear stretched image $I(x)$.

As mentioned above, there are a large number of noise points in the low grayscale level area and the high grayscale level area of the original image $I_0(x)$. If these areas are stretched with great force, the noise will increase significantly, which will affect the visual effect of the image. Therefore, the image processing device 100 can perform linear mapping, ranging from [0, lower) and (upper, 255] in the grayscale level histogram, according to the mapping rule, that is $$\text{new Level} = \begin{cases} \text{lower} \times \dfrac{i}{\text{start}}, & i < \text{lower} \\ \text{upper} + (255 - \text{upper}) \times \dfrac{i - \text{stop}}{255 - \text{stop}}, & i > \text{upper} \end{cases}$$

By linear processing this part, the present disclosure can keep the low grayscale level area and the high grayscale level area of the original image $I_0(x)$ as unchanged as possible, so as to avoid the significant increase of noise points caused by excessive stretching of this area, as well as ensure the image visual effect of this area.

On the contrary, for the pixel points whose grayscale level is between [lower, upper], the image processing device 100 can carry out nonlinear transform by calculating the average grayscale level u of the current image according to the mapping rules, and synthesize the $\gamma$ curve, that is $$u = \frac{\sum_{i}^{255} i \times hist[i]}{\sum_{i}^{255} hist[i]}$$

$$\gamma = \frac{\log(0.5)}{\log\left(\dfrac{u - \text{start}}{\text{stop} - \text{start}}\right)}$$

$$\alpha = \frac{\text{upper} - \text{start}}{255}$$

$$\text{new Level} = \begin{cases} \text{lower} + \alpha(uv^\gamma + (255 - u)v) \\ v = \dfrac{i - \text{start}}{\text{stop} - \text{start}} \end{cases}, \text{lower} \le i \le \text{upper}$$

In this way, the image processing device 100 can obtain the stretched image $I(x)$ by RGB contrast stretching according to the above formula. By carrying out the above RGB contrast stretching, the present disclosure can reliably and universally correct the images with color deviation problems, involving sand and dust interference, water wave interference, etc. through a small amount of calculation, and will not adversely affect the images without color deviation problems.

Further, in the embodiment shown in FIG. 2, the image processing device 100 can be downsampling the stretched image $I(x)$ obtained by the RGB contrast stretching to generate a thumbnail image Smp_I of the stretched image $I(x)$. In one embodiment, when downsampling the image $I(x)$ with the size of M*N by s times, the image processing device 100 can first divide the image $I(x)$ into $(M/s)*(N/s)$ windows with a size of s*s, and average all the pixel points in each window to obtain a mean downsampling image with a resolution of $(M/s)*(N/s)$. Because the ambient light has a smooth transition, the method of region mean downsampling adopted by the present disclosure can not only eliminate the impact of local jump in image $I(x)$, but also greatly reduce the amount of calculation in subsequent steps.

Please continue to refer to FIG. 2. The image processing method also includes step S220: preforming dark channel calculation and anti-bright channel calculation according to the original image to obtain a dark channel image and an anti-bright channel image respectively.

In one embodiment, during the dark channel calculation, the image processing device 100 can first acquire the grayscale value of each pixel point of the input thumbnail image Smp_I in R channel, G channel and B channel, and take the minimum value min(R, G, B) of the grayscale value of each pixel point in the R channel, the G channel and the B channel to determine a corresponding dark channel image $t_d$, that is $$t_d = \min(I^c(x))$$

and $I^c(x)$ is the colored thumbnail image Smp_I after downsampling; and the grayscale value of each pixel point of the thumbnail image Smp_I in the R channel, the G channel and the B channel can be calculated according to the grayscale value of the plurality of pixel points of the original image $I_0(x)$ in the R channel, the G channel and the B channel.

Correspondingly, during the anti-bright channel calculation, the image processing device 100 can first acquire the grayscale value of each pixel point of the input thumbnail image Smp_I in the R channel, the G channel and the B channel, and take the maximum value max(R, G, B) of the grayscale value of each pixel point in the R channel, the G channel and the B channel to determine a corresponding bright channel image. After that, the image processing device 100 can reverse the grayscale of the bright channel image, that is, subtract the maximum value max(R, G, B) from 255, which represents the maximum brightness in RGB, to obtain a corresponding anti-bright channel image $t_{ib}$, that is $$t_{ib}=255-\max(I^c(x))$$

and $I^c(x)$ is the colored thumbnail image Smp_I after downsampling; and the grayscale value of each pixel point of the thumbnail image Smp_I in the R channel, the G channel and the B channel can be calculated according to the grayscale value of the plurality of pixel points of the original image $I_0(x)$ in the R channel, the G channel and the B channel.

The method of preforming dark channel calculation and anti-bright channel calculation according to the thumbnail image Smp_I, is only a non-limiting embodiment provided by the present disclosure, which is intended to clearly display the main concept of the present disclosure, and provide some specific solutions that are convenient for the public to implement, rather than limiting all working modes or all functions of the present disclosure.

In other embodiments that do not include the RGB contrast stretching step and/or the downsampling step, the image processing device 100 can also perform dark channel calculation and anti-bright channel calculation based on the original image $I_0(x)$ and/or the stretched image $I(x)$ after the RGB contrast stretching, to obtain the corresponding dark channel image $t_d$ and anti-bright channel image $t_{ib}$, which will not be described here.

Further, as shown in FIG. 2, after acquiring the dark channel image $t_d$ and the anti-bright channel image $t_{ib}$, the image processing device 100 can also filter the acquired dark channel image $t_d$ to obtain a filtered dark channel image Flt_td, so as to eliminate the edge influence, ensure the local smooth transition of the dark channel image Flt_td, and prevent the color jump of partial area in subsequent processing from affecting the visual effect. Additionally, the image processing device 100 can filter the acquired anti-bright channel image $t_{ib}$ to obtain a filtered anti-bright channel image Flt_tib, so as to eliminate the edge influence, ensure the local smooth transition of the anti-bright channel image Flt_tib, and prevent the color jump of partial area in subsequent processing from affecting the visual effect. Herein, filtering methods include but are not limited to mean filtering, Gaussian filtering and other edge preserving filtering. Technicians can choose freely according to the computing power of the image processing device 100, and there is no limit here.

Please continue to refer to FIG. 2. The image processing method also includes step S230: processing the dark channel image according to a defogging model to obtain a bright area enhanced image, processing the anti-bright channel image according to the defogging model to obtain a dark area enhanced image; and combining the bright area enhanced image and the dark area enhanced image to obtain an enhanced image.

The defogging model is an existing technology in the field, removing fog interference in the image by estimating the transmittance t(x) and the atmospheric light intensity component A. The basic formula thereof is as follows:

$$I(x)=J(x)t(x)+A(1-t(x))$$

and I(x) is the image to be processed with interference, J(x) is the output image without interference, t(x) is the transmittance and A is the atmospheric light intensity parameter.

In some embodiments of the present disclosure, the above t(x) is equivalent to wt(x), that is, adjusting t (x) by setting an adjustment parameter w. In this way, the formula of the above defogging model can be optimized as:

$$J(x) = \frac{I(x) - w\tilde{t}(x)A}{\max\left(1 - w\tilde{t}(x), t_0\right)}$$

and $\tilde{wt}(x)=1-wt(x)$, the larger the adjustment parameter w is, the greater the fog density is, to is a small value used to avoid dividing by zero. From the above optimization formula of the defogging model, it can be seen that the adjustment parameter w and the atmospheric light intensity parameter A is the key to obtain the ideal defogging model results.

Figure 5:
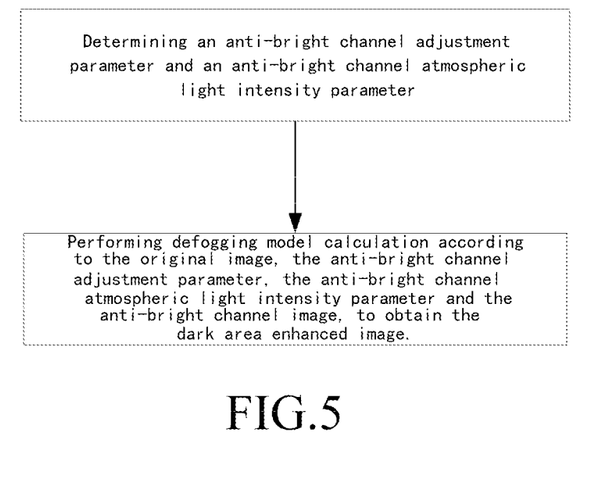
FIG. 5 shows a flowchart of a method for acquiring dark area enhanced images according to some embodiments of the present disclosure.

Please refer to FIG. 5, which shows a flow chart of a method for acquiring dark area enhanced image provided according to some embodiments of the present disclosure.

As shown in FIG. 5, in the process of acquiring the dark area enhanced image, the image processing device 100 can first determine an anti-bright channel adjustment parameter $w_{ib}$, and an anti-bright channel atmospheric light intensity parameter $A_{ib}$, and then performing defogging model calculation according to the original image $I_0(x)$, the anti-bright channel adjustment parameter $w_{ib}$, the anti-bright channel atmospheric light intensity parameter $A_{ib}$ and the anti-bright channel image Flt_tib, to obtain the dark area enhanced image $J_d(x)$.

In one embodiment, in the process of determining the anti-bright channel adjustment parameter $w_{ib}$, the image processing device 100 can respectively determine the average grayscale value $\overline{sR}$, $\overline{sG}$, $\overline{sB}$ of each pixel point of the thumbnail image Smp_I in the R channel, the G channel and the B channel, that is $$\overline{sR}=\text{mean}(sR), \overline{sG}=\text{mean}(sG), \overline{sB}=\text{mean}(sB)$$

and sR indicates the grayscale value of each pixel point of the thumbnail image Smp_I in the R channel; sG indicates the grayscale value of each pixel point of the thumbnail image Smp_I in the G channel; sB indicates the grayscale value of each pixel point of the thumbnail image Smp_I in the B channel; and the grayscale value of each pixel point of the thumbnail image Smp_I in the R channel, the G channel and the B channel can be calculated according to the grayscale value of the plurality of pixel points of the original image $I_0(x)$ in the R channel, the G channel and the B channel.

Afterwards, the image processing device 100 can perform inverse color processing according to the average value $\overline{sR}$ of the R channel, the average value $\overline{sG}$ of the G channel and the average value $\overline{sB}$ of the B channel, to obtain a first adaptive parameter $w_1$, that is $$w_1 = 1 - \frac{\overline{sR}+\overline{sG}+\overline{sB}}{255 \times 3}$$

Further, in order to avoid the excessive dark area enhancement effect to the image I(x) to be processed, caused by an extremely small first adaptive parameter $w_1$, the image processing device 100 can determine an anti-bright channel adjustment parameter $w_{ib}$ according to a preset lower limit parameter $w_0$, to limit its minimum value, that is $$w_{ib} = \min\left(w_0, 1 - \frac{\overline{sR} + \overline{sG} + \overline{sB}}{255 \times 3}\right)$$

and $w_0$ can be calibrated by prior experiments, whose value range is [0, 1] and can be 0.6 in this embodiment.

Additionally, in the process of determining the anti-bright channel atmospheric light intensity parameter $A_{ib}$, the image processing device 100 can respectively acquire the thumbnail image Smp_I and the filtered anti-bright channel image Flt_tib. The thumbnail image Smp_I and the anti-bright channel image Flt_tib has the same image size, i.e. sw*sh=smp_sz. After that, the image processing device 100 can sort the grayscale values of each pixel point of the filtered anti-bright channel image from large to small, and take the top $n_3$ (e.g. smp_sz/1000) pixels points. After that, the image processing device 100 can take the average value of the R channel grayscale, the G channel grayscale and the B channel grayscale of each corresponding pixel point in Smp_I respectively, to obtain the anti-bright channel atmospheric light intensity parameter $A_{ib}$. The vector of the anti-bright channel atmospheric light intensity parameter $A_{ib}$ includes three values $A_{ib\_}R$, $A_{ib\_}G$, $A_{ib\_}B$, which indicate the anti-bright channel atmospheric light intensity parameters of the three channels of RGB respectively.

After determining the anti-bright channel adjustment parameter $w_{ib}$ and the anti-bright channel atmospheric light intensity parameter $A_{ib}$, the image processing device 100 can perform upsampling to the filtered anti-bright channel image Flt_tib, and restore it to the anti-bright channel image Res_tib with the same size as the original image $I_0(x)$ by linear interpolation amplification.

The upsampling step is implemented corresponding to the downsampling step, used to convert the anti-bright channel image Flt_tib to the same size as the original image $I_0(x)$ for defogging model calculation. By performing the downsampling and upsampling steps, the present disclosure can further reduce the amount of calculation of the adjustment parameter w and the atmospheric light intensity parameter A, and is more suitable for various embedded platforms. In other embodiments that do not include the downsampling step, the image processing device 100 can also skip the upsampling step and calculate the defogging model directly.

In the process of calculating the dark area enhanced image based on the defogging model, the image processing device 100 can substitute the image I(x) to be processed, the anti-bright channel adjustment parameter $w_{ib}$, the anti-bright channel atmospheric light intensity parameter $A_{ib}$, and the anti-bright channel image Res_tib into the defogging model to calculate the dark area enhanced image $J_d(x)$, that is $$J_d(x) = \frac{I(x) - w_{ib}t_{ib}A_{ib}}{\max(1 - w_{ib}t_{ib}, t_0)}$$

and I(x) can select the original image $I_0(x)$ or the stretched image I(x) after RGB contrast stretching, and $t_{ib}$ can select the anti-bright channel image Res_tib obtained by upsampling.

Correspondingly, in the process of calculating the bright area enhanced image based on the defogging model, the image processing device 100 can also determine the dark channel adjustment parameter $w_d$ and the dark channel atmospheric light intensity parameter $A_d$, and then performing the defogging model calculation according to the original image I(x), the dark channel adjustment parameter $w_d$, the dark channel atmospheric light intensity parameter $A_d$ and the dark channel image Flt_td, to obtain the bright area enhanced image $J_b(x)$.

In one embodiment, in the process of determining the dark channel adjustment parameter $w_d$, the image processing device 100 can determine the average grayscale value sR, sG, sB of each pixel point of the thumbnail image Smp_I in the R channel, the G channel and the B channel, and then determine a second adaptive parameter $w_2$ according to the R channel grayscale value sR, the G channel grayscale value sG and the B channel grayscale value sB, that is:

$$w_2 = \frac{sR + sG + sB}{255 \times 3}$$

Further, in order to avoid the excessive bright area enhancement effect to the image I(x) to be processed, caused by an extremely small second adaptive parameter $w_2$, the image processing device 100 can determine the dark channel adjustment parameter $w_d$ according to the preset lower limit parameter $w_0$, and limit its minimum value, that is $$w_d = \min\left(w_0, \frac{sR + sG + sB}{255 \times 3}\right)$$

and $w_0$ can be calibrated by prior experiments, whose value range is [0, 1] and can be 0.85 in this embodiment.

Additionally, in the process of determining the dark channel atmospheric light intensity parameter $A_d$, the image processing device 100 can respectively acquire the thumbnail image Smp_I and the filtered dark channel image Flt_tib. The thumbnail image Smp_I and the dark channel image Flt_tib has the same image size, i.e. sw*sh=smp_sz. After that, the image processing device 100 can sort the grayscale values of each pixel point of the filtered dark channel image from large to small, and take the top $n_4$ (e.g. smp_sz/1000) pixels points. After that, the image processing device 100 can take the average value of the R channel grayscale, the G channel grayscale and the B channel grayscale of each corresponding pixel point in the Smp_I respectively, to obtain the dark channel atmospheric light intensity parameter $A_d$. The vector of the dark channel atmospheric light intensity parameter $A_d$ includes three values $A_{d\_}R$, $A_{d\_}G$, $A_{d\_}B$, which indicate the dark channel atmospheric light intensity parameters of the three channels of RGB respectively.

After determining the dark channel adjustment parameter $w_d$ and the dark channel atmospheric light intensity parameter $A_d$, the image processing device 100 can perform upsampling to the filtered dark channel image Flt_tib, and restore it to the dark channel image Res_td with the same size as the original image $I_0(x)$ by linear interpolation amplification.

The upsampling step is implemented corresponding to the downsampling step, used to convert the dark channel image Flt_td to the same size as the original image $I_0(x)$ for defogging model calculation. By performing the downsampling and upsampling steps, the present disclosure can further reduce the amount of calculation of the adjustment parameter w and the atmospheric light intensity parameter A, and is more suitable for various embedded platforms. In other embodiments that do not include the downsampling step, the image processing device 100 can also skip the upsampling step and calculate the defogging model directly.

In the process of calculating the bright area enhanced image based on the defogging model, the image processing device 100 can substitute the image I(x) to be processed, the dark channel adjustment parameter $w_d$, the dark channel atmospheric light intensity parameter $A_d$ and the dark channel image Res_td into the defogging model, to calculate the bright area enhanced image $J_b(x)$, that is $$J_b(x) = \frac{I(x) - w_d t_d A_d}{\max(1 - w_d t_d, t_0)}$$

and I(x) can select the original image $I_0(x)$ or the stretched image I(x) after RGB contrast stretching, and $t_d$ can select the dark channel image Res_td obtained by upsampling.

After determining the bright area enhanced image $J_b(x)$ and the dark area enhanced image $J_d(x)$, the image processing device 100 can combine the bright area enhanced image $J_b(x)$ and the dark area enhanced image $J_d(x)$ to obtain the enhanced image J(x).

In one embodiment, in the above combination operation, the black part of the image, that is the dark area enhanced image $J_d(x)$, need to output a weak light enhancement result as far as possible, while the bright part of the image, that is the bright area enhanced image $J_b(x)$, need to output a defogging result. Therefore, the image processing device 100 can determine a third adaptive parameter $w_3$ of the bright area enhanced image $J_b(x)$ and a fourth adaptive parameter $w_4$ of the dark area enhanced image $J_d(x)$ according to the grayscale value of the dark area enhanced image $J_d(x)$, that is $$w_3 = \frac{J_d(x)}{255}$$

$$w_4 = 1 - \frac{J_d(x)}{255}$$

and the sum of the third adaptive parameter $w_3$ and the fourth adaptive parameter $w_4$ is 1.

After that, the image processing device 100 can perform weighted summation to the dark area enhanced image $J_d(x)$ and the bright area enhanced image $J_b(x)$ according to the third adaptive parameter $w_3$ and the fourth adaptive parameter $w_4$, to obtain the enhanced image J(x), that is $$J(x) = \frac{J_d(x)}{255} J_b(x) + \left(1 - \frac{J_d(x)}{255}\right) J_d(x)$$

By calculating the anti-bright channel image $t_{ib}$, and combining the anti-bright channel adjustment parameter $w_{ib}$ and the anti-bright channel atmospheric light intensity parameter $A_{ib}$ to performing the defogging model calculation to it, the present disclosure can use the defogging model to achieve the effect of image dark area enhancement. Further, by combining the bright area enhanced image $J_b(x)$ and the dark area enhanced image $J_d(x)$, the present disclosure does not need to classify the interference scenarios in the earlier stage, and can directly use the defogging model to synchronously achieve general image enhancement effects such as defogging and dark area enhancement, to reduce the amount of image processing operations while improving the image quality and image visual effect, so as to adapt to various embedded platforms better. Furthermore, determining the third adaptive parameter $w_3$ and the fourth adaptive parameter $w_4$ of the above combination operation by combining the grayscale value of the dark area enhanced image $J_d(x)$, the present disclosure can adjust the combination weight of the bright area enhanced image $J_b(x)$ and the dark area enhanced image $J_d(x)$ according to the actual light and dark conditions of the original image $I_0(x)$, so as to obtain more authentic enhanced images, and improve the reliability and universality of the image processing method.

To sum up, the above image enhancement processing technology provided by the present disclosure not only has the advantages of low computing power requirements, fast computing speed, which can meet the real-time requirements of image processing, but also can carry out general image enhancement processing for photos taken in fog, dust, weak light scenario, underwater photography and other lighting interference environments through a small amount of computing, so as to improve the image quality and enhance the visual effect of the image to make it more suitable for various embedded platforms.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

The information, signals and data can be represented using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

Various illustrative logic blocks, modules, circuits and algorithm steps described in combination with the embodiments disclosed herein can be implemented as electronic hardware, computer software or a combination of both. In order to clearly explain the interchangeability of hardware and software, various illustrative components, blocks, modules, circuits and steps are generally described above in the form of their functionality. Whether such functionality is implemented as hardware or software depends on the specific application and design constraints imposed on the overall system. Technicians can implement the described functionality in different ways for each specific application, but such implementation decisions should not be interpreted as leading to departure from the scope of the disclosure.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, a plurality of microprocessors, one or more microprocessors cooperating with the DSP core or any other such configuration.

What is claimed is:

1. An image processing method:
acquiring an original image;
performing dark channel calculation according to the original image to obtain a dark channel image;
performing anti-bright channel calculation according to the original image to obtain an anti-bright channel image;
processing the dark channel image according to a defogging model to obtain a bright area enhanced image;
determining an anti-bright channel adjustment parameter and an anti-bright channel atmospheric light intensity parameter, wherein
the anti-bright channel adjustment parameter is determined by following steps: respectively determining average grayscale values of R channel, G channel and B channel of a plurality of pixel points in the original image; carrying out inverse color processing according to the average grayscale values of the R channel, the G channel and the B channel to determine a first adaptive parameter; and determining the anti-bright channel adjustment parameter according to the first adaptive parameter, or
the anti-bright channel atmospheric light intensity parameter is determined by following steps: determining a plurality of pixel points with higher grayscale value in the anti-bright channel image; respectively determining R channel grayscale, G channel grayscale and B channel grayscale of the plurality of pixel points according to the original image; and respectively determining an atmospheric light intensity parameter of the R channel, the G channel and the B channel, according to an average grayscale value of the R channel, an average grayscale value of the G channel and an average grayscale value of the B channel;
performing defogging model calculation according to the original image, the anti-bright channel adjustment parameter, the anti-bright channel atmospheric light intensity parameter and the anti-bright channel image to obtain a dark area enhanced image; and
combining the bright area enhanced image and the dark area enhanced image to obtain an enhanced image.

2. The image processing method according to claim 1, wherein the performing anti-bright channel calculation according to the original image to obtain an anti-bright channel image comprise:
determining a bright channel image according to a maximum value of R channel, G channel and B channel of a plurality of pixel points in the original image; and
performing grayscale inversion to the bright channel image to obtain the anti-bright channel image.

3. The image processing method according to claim 1, wherein the processing the dark channel image according to a defogging model to obtain a bright area enhanced image comprise:
determining grayscale values of R channel, G channel and B channel of a plurality of pixel points in the original image;
determining a second adaptive parameter according to the R channel grayscale value, G channel grayscale value and B channel grayscale value;
determining a dark channel adjustment parameter according to the second adaptive parameter;
determine an atmospheric light intensity parameter of a dark channel; and
performing defogging model calculation according to the original image, the dark channel adjustment parameter, the atmospheric light intensity parameter of the dark channel and the dark channel image to obtain the bright area enhanced image.

4. An image processing method, comprising:
acquiring an original image;
respectively acquiring a grayscale level histogram of R channel, G channel and B channel of the original image;
determining a first position and a second position of adaptive nonlinear stretching according to a preset truncation ratio, wherein a grayscale value indicated by the first position is lower than a grayscale value indicated by the second position;
performing linear mapping to the grayscale level histogram between a grayscale interval below the first position and above the second position, and performing mapping to the grayscale level histogram based on a γ curve, according to an average grayscale value in original image and in the grayscale interval between the first position and the second position, to obtain an adaptive nonlinear stretched image;
performing dark channel calculation according to the adaptive nonlinear stretched image to obtain a dark channel image;
performing anti-bright channel calculation according to the adaptive nonlinear stretched image to obtain an anti-bright channel image;
processing the dark channel image according to a defogging model to obtain a bright area enhanced image;
processing the anti-bright channel image according to the defogging model to obtain a dark area enhanced image; and
combining the bright area enhanced image and the dark area enhanced image to obtain an enhanced image.

5. The image processing method according to claim 4, wherein before the dark channel calculation and the anti-bright channel calculation, the image processing method further comprises:
downsampling the adaptive nonlinear stretched image for performing the dark channel calculation and/or the anti-bright channel calculation to obtain a thumbnail image, wherein the thumbnail image replaces the adaptive nonlinear stretched image and is used for performing the dark channel calculation and/or the anti-bright channel calculation.

6. The image processing method according to claim 5, wherein before obtaining the bright area enhanced image and the dark area enhanced image, the image processing method further comprises:
performing upsampling according to the dark channel image to obtain a dark channel image with a same size as the original image; and
performing upsampling according to the anti-bright channel image to obtain an anti-bright channel image with a same size as the original image.

7. The image processing method according to claim 6, wherein before performing upsampling according to the dark channel image and the anti-bright channel image, the image processing method further comprises:
performing wave filtering to the dark channel image and the anti-bright channel image.

8. An image processing method, comprising:
acquiring an original image;

performing dark channel calculation according to the original image to obtain a dark channel image;

performing anti-bright channel calculation according to the original image to obtain an anti-bright channel image;

processing the dark channel image according to a defogging model to obtain a bright area enhanced image;

processing the anti-bright channel image according to the defogging model to obtain a dark area enhanced image;

determining a third adaptive parameter of the bright area enhanced image and a fourth adaptive parameter of the dark area enhanced image, according to a grayscale value of the dark area enhanced image, wherein a sum of the third adaptive parameter and the fourth adaptive parameter is 1; and performing weighted summation to the dark area enhanced image and the bright area enhanced image according to the third adaptive parameter and the fourth adaptive parameter to obtain an enhanced image.

9. An image processing device, comprising:
a memory; and
a processor, connected to the memory, wherein sets of instructions, when executed by the processor, cause the processor to:
acquire an original image;
perform dark channel calculation according to the original image to obtain a dark channel image;
perform anti-bright channel calculation according to the original image to obtain an anti-bright channel image;
process the dark channel image according to a defogging model to obtain a bright area enhanced image;
determine an anti-bright channel adjustment parameter and an anti-bright channel atmospheric light intensity parameter, wherein
the anti-bright channel adjustment parameter is determined by following steps: respectively determining average grayscale values of R channel, G channel and B channel of a plurality of pixel points in the original image; carrying out inverse color processing according to the average grayscale values of the R channel, the G channel and the B channel to determine a first adaptive parameter; and determining the anti-bright channel adjustment parameter according to the first adaptive parameter, or
the anti-bright channel atmospheric light intensity parameter is determined by following steps: determining a plurality of pixel points with higher grayscale value in the anti-bright channel image; respectively determining R channel grayscale, G channel grayscale and B channel grayscale of the plurality of pixel points according to the original image; and respectively determining an atmospheric light intensity parameter of the R channel, the G channel and the B channel, according to an average grayscale value of the R channel, an average grayscale value of the G channel and an average grayscale value of the B channel;
perform defogging model calculation according to the original image, the anti-bright channel adjustment parameter, the anti-bright channel atmospheric light intensity parameter and the anti-bright channel image to obtain a dark area enhanced image; and
combine the bright area enhanced image and the dark area enhanced image to obtain an enhanced image.

10. A non-transitory computer-readable storage medium, in which computer instructions are stored, wherein when the computer instructions are executed by a processor, cause the processor to:
acquire an original image;
perform dark channel calculation according to the original image to obtain a dark channel image;
perform anti-bright channel calculation according to the original image to obtain an anti-bright channel image;
process the dark channel image according to a defogging model to obtain a bright area enhanced image;
determine an anti-bright channel adjustment parameter and an anti-bright channel atmospheric light intensity parameter, wherein
the anti-bright channel adjustment parameter is determined by following steps: respectively determining average grayscale values of R channel, G channel and B channel of a plurality of pixel points in the original image; carrying out inverse color processing according to the average grayscale values of the R channel, the G channel and the B channel to determine a first adaptive parameter; and determining the anti-bright channel adjustment parameter according to the first adaptive parameter, or
the anti-bright channel atmospheric light intensity parameter is determined by following steps: determining a plurality of pixel points with higher grayscale value in the anti-bright channel image; respectively determining R channel grayscale, G channel grayscale and B channel grayscale of the plurality of pixel points according to the original image; and respectively determining an atmospheric light intensity parameter of the R channel, the G channel and the B channel, according to an average grayscale value of the R channel, an average grayscale value of the G channel and an average grayscale value of the B channel;
perform defogging model calculation according to the original image, the anti-bright channel adjustment parameter, the anti-bright channel atmospheric light intensity parameter and the anti-bright channel image to obtain a dark area enhanced image; and
combine the bright area enhanced image and the dark area enhanced image to obtain an enhanced image.

* * * * *